US012491616B2

(12) United States Patent
Wekwert et al.

(10) Patent No.: US 12,491,616 B2
(45) Date of Patent: Dec. 9, 2025

(54) MODULAR CONCRETE TOOL

(71) Applicant: MILWAUKEE ELECTRIC TOOL CORPORATION, Brookfield, WI (US)

(72) Inventors: James Wekwert, Whitefish Bay, WI (US); Kyle Reeder, Waukesha, WI (US); Colin J. Roberts, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 253 days.

(21) Appl. No.: 18/167,116

(22) Filed: Feb. 10, 2023

(65) Prior Publication Data

US 2023/0249330 A1 Aug. 10, 2023

Related U.S. Application Data

(60) Provisional application No. 63/308,817, filed on Feb. 10, 2022.

(51) Int. Cl.

| | |
|---|---|
| ***B25F 3/00*** | (2006.01) |
| ***B25F 5/02*** | (2006.01) |
| ***B28D 1/04*** | (2006.01) |
| ***E04F 21/24*** | (2006.01) |
| ***E04G 21/08*** | (2006.01) |

(52) U.S. Cl.

CPC .................. *B25F 3/00* (2013.01); *B25F 5/02* (2013.01); *B28D 1/045* (2013.01); *E04F 21/242* (2013.01); *E04G 21/08* (2013.01)

(58) Field of Classification Search

CPC .... B28D 1/045; B25F 3/00; B25F 5/02; E04F 21/242; E04G 21/08

See application file for complete search history.

(56) References Cited

U.S. PATENT DOCUMENTS

| | | | | |
|---|---|---|---|---|
| 5,984,571 A * | 11/1999 | Owens | E04F 21/242 | 404/97 |
| 6,200,065 B1 * | 3/2001 | Eitzen | E01C 19/402 | 404/114 |
| 2007/0201302 A1 * | 8/2007 | Lindley | E01C 19/402 | 366/123 |
| 2023/0330698 A1 * | 10/2023 | Paske | E04F 21/242 | |

FOREIGN PATENT DOCUMENTS

| | | | | |
|---|---|---|---|---|
| EP | 3322086 A2 * | 5/2018 | A01B 33/082 |
| WO | WO-03097939 A1 * | 11/2003 | E01C 19/402 |
| WO | WO-2021090605 A1 * | 5/2021 | B06B 1/04 |

* cited by examiner

*Primary Examiner* — Eyamindae C Jallow

(74) *Attorney, Agent, or Firm* — Michael Best & Friedrich LLP

(57) ABSTRACT

A modular concrete tool includes a modular power unit that has a housing with a motor housing portion and a front housing portion coupled to the motor housing portion, a battery receptacle configured to removably engage a battery pack, a handle extending from the motor housing portion, a motor disposed within the motor housing portion, the motor configured to provide torque to an output shaft extending through the front housing portion, and a tool socket formed in the front housing portion in which the output shaft terminates.

28 Claims, 16 Drawing Sheets

MODULAR CONCRETE TOOL

CROSS-REFERENCE TO RELATED APPLICATIONS

This application claims priority to U.S. Provisional Patent Application No. 63/308,817 filed on Feb. 10, 2022, the entire content of which is incorporated herein by reference.

FIELD OF THE INVENTION

The present invention relates to concrete tools, and more particularly to battery powered, modular concrete tools.

BACKGROUND OF THE INVENTION

Concrete finishing is essential to most building construction. Typically, concrete needs to be vibrated in order to properly flow around the reinforcing bar and into all of the nooks and crannies of concrete forms. Once the concrete is poured, it requires smoothing via a concrete screed, so a finished concrete surface is nearly as flat as possible to facilitate building on the concrete surface, driving on the concrete surface, etc. Finally, green concrete, i.e., concrete that has not fully hardened, may require joints cut therein using an early entry saw in order to prevent cracking of the concrete as it dries and contracts and to provide stress relief to prevent future cracking. Accordingly, the industry is always in need of new tools to make the pour and finishing of concrete easier and more efficient.

SUMMARY OF THE INVENTION

The present disclosure provides, in one aspect, a modular concrete tool that includes a modular power unit that has a housing with a motor housing portion and a front housing portion coupled to the motor housing portion, a battery receptacle configured to removably engage a battery pack, a handle extending from the motor housing portion, a motor disposed within the motor housing portion, the motor configured to provide torque to an output shaft extending through the front housing portion; and a tool socket formed in the front housing portion in which the output shaft terminates.

The present disclosure provides, in another aspect a modular concrete tool that includes a modular power unit that includes a housing with a motor housing portion and a front housing portion coupled to the motor housing portion, a battery receptacle configured to removably engage a battery pack, a handle extending from the motor housing portion, a motor disposed within the motor housing portion, the motor having an output shaft, and a tool socket formed in the front housing portion in which the output shaft terminates and a concrete tool accessory including a tool plug configured to removably engage the tool socket.

The present disclosure provides, in still another aspect a modular concrete tool that includes a modular power unit having a housing with a motor housing portion and a front housing portion coupled to the motor housing portion, a battery receptacle configured to removably engage a battery pack, a handle extending from a top of the motor housing portion, a motor disposed within the motor housing portion, the motor configured to provide torque to an output shaft extending through the front housing portion, and a tool socket formed in the front housing portion in which the output shaft terminates, and a concrete tool accessory that includes a modular power unit receptacle with a direct drive plug extending therein, wherein the modular power unit fits into the modular power unit receptacle and the tool socket fits over the direct drive plug to allow the direct drive plug to engage the output shaft.

Features and aspects of the disclosure will become apparent by consideration of the following detailed description and accompanying drawings.

Before any embodiments of the present invention are explained in detail, it is to be understood that the embodiments described herein are not limited in scope or application to the details of construction and the arrangement of components set forth in the following description or as illustrated in the following drawings. The devices described herein are capable of other embodiments and of being practiced or of being carried out in various ways. Also, it is to be understood that the phraseology and terminology used herein is for the purpose of description and should not be regarded as limiting.

DETAILED DESCRIPTION

A modular concrete tool includes a modular power unit, described below, and one or more concrete tools, described below, that may be selectively, and removably, engaged with the modular power unit. The one or more concrete tools may include a needle vibrator, a vibrating screed, an early entry saw, etc. The modular power unit provides power to each of the concrete tools via a drive shaft or a direct drive connection. The modular power unit may include handles for controlling the modular concrete tool. The handles may be shared between the modular power unit and the particular concrete tool. Finally, the handles may be on the concrete tool while the modular power unit plugs into the concrete tool to provide power. Additionally, in certain aspects, control of the concrete tool may be actuated by a trigger on the modular power unit, or the concrete tool may include controls that plug into the modular power unit and control the modular power unit and the operation of the concrete tool.

Figure 1:
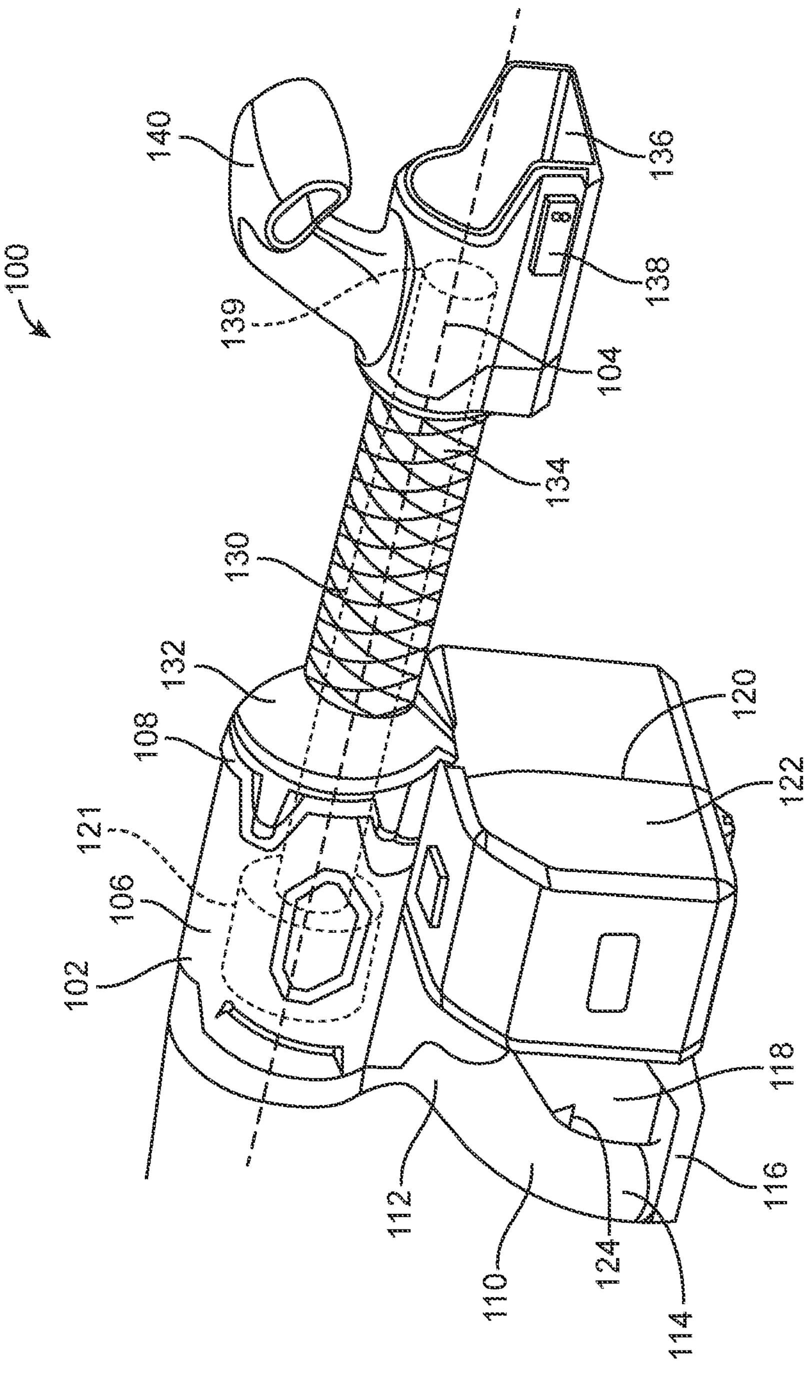
FIG. 1 is a perspective view of a modular power unit for a modular concrete tool in accordance with a first embodiment of the present invention.

Referring initially to FIG. 1, a modular power unit is illustrated and is generally designated 100. As shown, the modular power unit 100 includes a housing 102 that extends along a longitudinal axis 104. The housing 102 includes a motor housing portion 106 and a front housing portion 108 coupled to the motor housing portion 106. A first handle 110 extends in a generally rearward and downward direction from the motor housing portion 106. The first handle 110 is generally shaped like a pistol grip and includes a proximal end 112 coupled to the motor housing portion 106 and a distal end 114 coupled to a battery receptacle in front of the first handle 110 and below the housing 102 via a lateral arm 116.

The first handle 110 is spaced apart from the battery receptacle such that an aperture 118 is established, or otherwise formed, between the first handle 110 and the motor housing portion 106. The first handle 110 acts as a grip that can be grasped by a user during operation of the modular power unit 100. The modular power unit 100 further includes a battery receptacle 120 formed in a sidewall of the housing 102 in front of the first handle 110. A motor 121 disposed in the motor housing portion 106 of the housing 102 of the modular power unit 100 is powered by a direct current (DC) battery pack 122 that is removably engaged with the battery receptacle 120 in front of the first handle 110. The battery pack 122 includes a plurality of rechargeable battery cells electrically connected to each other in order to provide a desired output (e.g., nominal voltage, current capacity, etc.) of the battery pack 122. In a particular aspect, the battery pack 122 includes a plurality of Lithium-based batteries, e.g., Lithium, Lithium-ion, etc. The first handle 110 of the modular power unit 100 includes a trigger switch 124 to selectively electrically connect the motor 121 within the motor housing portion 106 to the battery pack 122 and as such, provide DC power to the motor 121.

As illustrated in FIG. 1, the modular power unit 100 includes a tool extension 130 that is connected to, and extends from, the front housing portion 108. The tool extension 130 includes a proximal end 132 and a distal end 134. The proximal end 132 of the tool extension 130 is coupled to the front housing portion 108 of the modular power unit 100. The distal end 134 of the tool extension 130 includes a tool socket 136. The tool socket 136 is configured to engage a tool plug of a concrete tool, as described in greater detail below. The modular power unit 100 further includes a lock/release button 138 adjacent to the tool socket 136. The lock/release button 138 may engage a complementary structure on the tool plug of a concrete tool to maintain the drive shaft of the concrete tool in engagement with an output shaft 139 of the motor 121 of the modular power unit 100 that extends into the tool socket 136.

As shown, the modular power unit 100 also includes a second handle 140 on the tool socket 136. The second handle 140 may be grasped by the user during operation of the modular power unit 100 to further help balance and manipulate the modular power unit 100. While the second handle 140 is shown on the tool socket 136, it is to be understood that the second handle 140 may be placed anywhere along the length of the tool extension 130.

Figure 2:
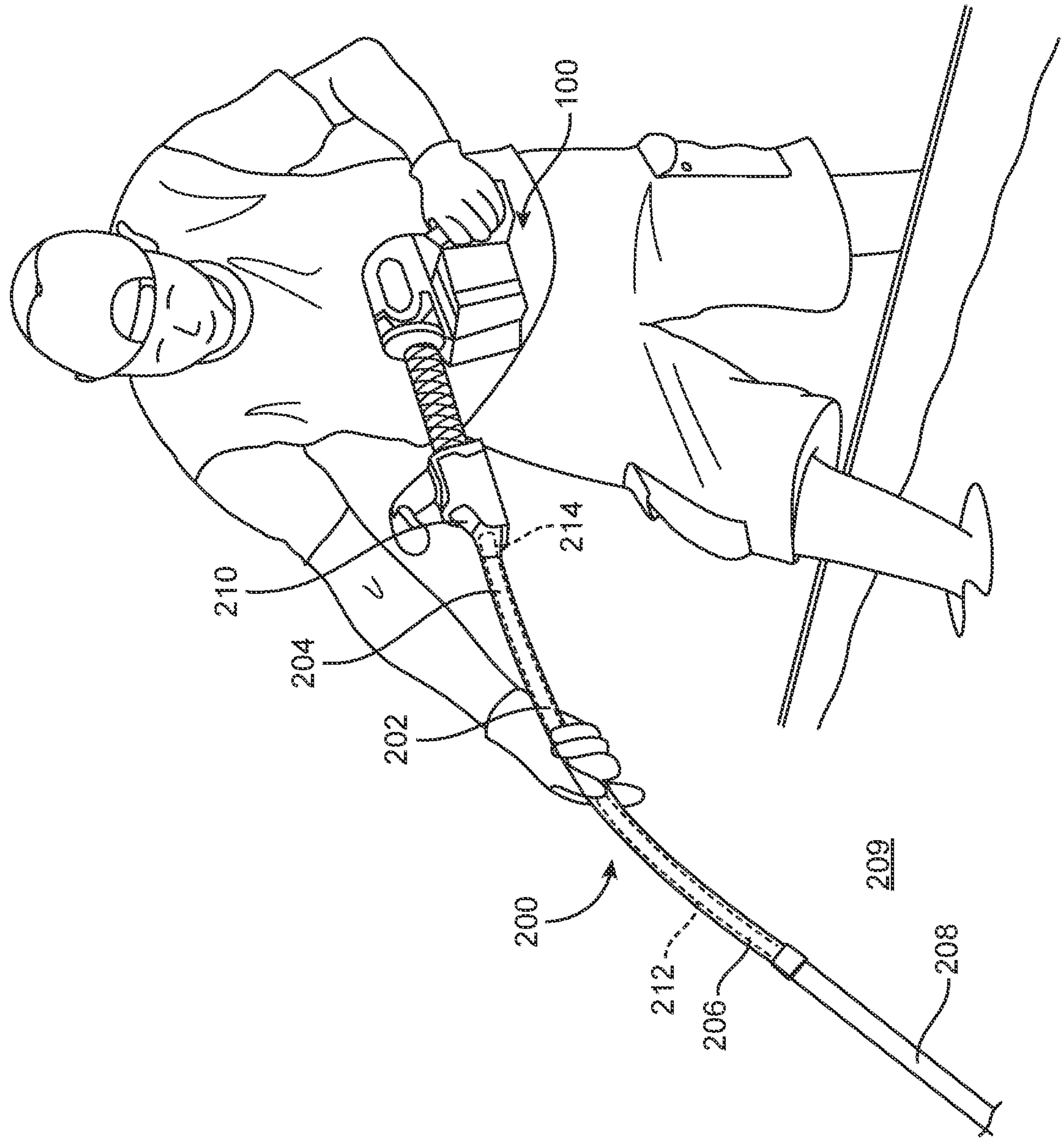
FIG. 2 is a perspective view of the modular power unit of FIG. 1 connected to a needle vibrator in accordance with an embodiment of the present invention.

Referring now to FIG. 2, the modular power unit 100 is shown engaged with a concrete tool accessory, such as a needle vibrator 200. The needle vibrator 200 includes a flexible drive shaft housing 202 having a proximal end 204 and a distal end 206. The distal end 206 includes an elongated vibrator 208 that is inserted into wet concrete 209 to vibrate the wet concrete 209 to eliminate voids and air bubbles within and around the reinforcing rod and concrete forms. The proximal end 204 of the flexible drive shaft housing 202 of the needle vibrator 200 includes a tool plug 210 that is sized and shaped to fit into and engage the tool socket 136 on the modular power unit 100. For example, the tool plug 210 includes a flat and the tool socket 136 includes a complementary flat. Further, the tool plug 210 is shaped, in cross-section, like a triangle, a square, a pentagon, a hexagon, a heptagon, an octagon, a nonagon, a decagon, etc., and the tool socket 136 is complementarily shaped. In another aspect, the tool plug 210 includes splines and the tool socket 136 is complementarily shaped. It is to be understood that, in one aspect, the tool plug 210 is a male connector and the tool socket 136 is a female connection. However, in another aspect, this arrangement is reversed such that the tool plug 210 is a female connector and the tool socket 136 is a male connector. A flexible drive shaft 212 within the flexible drive shaft housing 202 of the needle vibrator 200 includes an end 214 that is configured to engage the output shaft 139 of the motor 121 within the modular power unit 100. For example, the end 214 of the drive shaft 212 includes a flat and the output shaft 139 of the motor 121 includes a complementary flat. Further, the end 214 of the drive shaft 212 is shaped, in cross-section, like a triangle, a square, a pentagon, a hexagon, a heptagon, an octagon, a nonagon, a decagon, etc., and the output shaft 139 of the motor 121 is complementarily shaped. In another aspect, the end 214 of the drive shaft 212 includes splines and the output shaft 139 of the motor 121 is complementarily shaped. It is to be understood that, in one aspect, the end 214 of the drive shaft 212 is a male connector and the output shaft 139 of the motor 121 is a female connection. However, in another aspect, this arrangement is reversed such that the end 214 of the drive shaft 212 is a female connector and the output shaft 139 of the motor 121 is a male connector.

Accordingly, a user actuates the motor of the modular power unit 100 by depressing the trigger 124 on the first handle 110. The motor drives the output shaft of the modular power unit 100 which, in turn, drives the flexible drive shaft within the flexible drive shaft housing 202 of the needle vibrator 200 to actuate the elongated vibrator 208 on the distal end 206 of the flexible drive shaft housing 202 and vibrate the wet concrete in which the elongated vibrator 208 is disposed.

Figure 3:
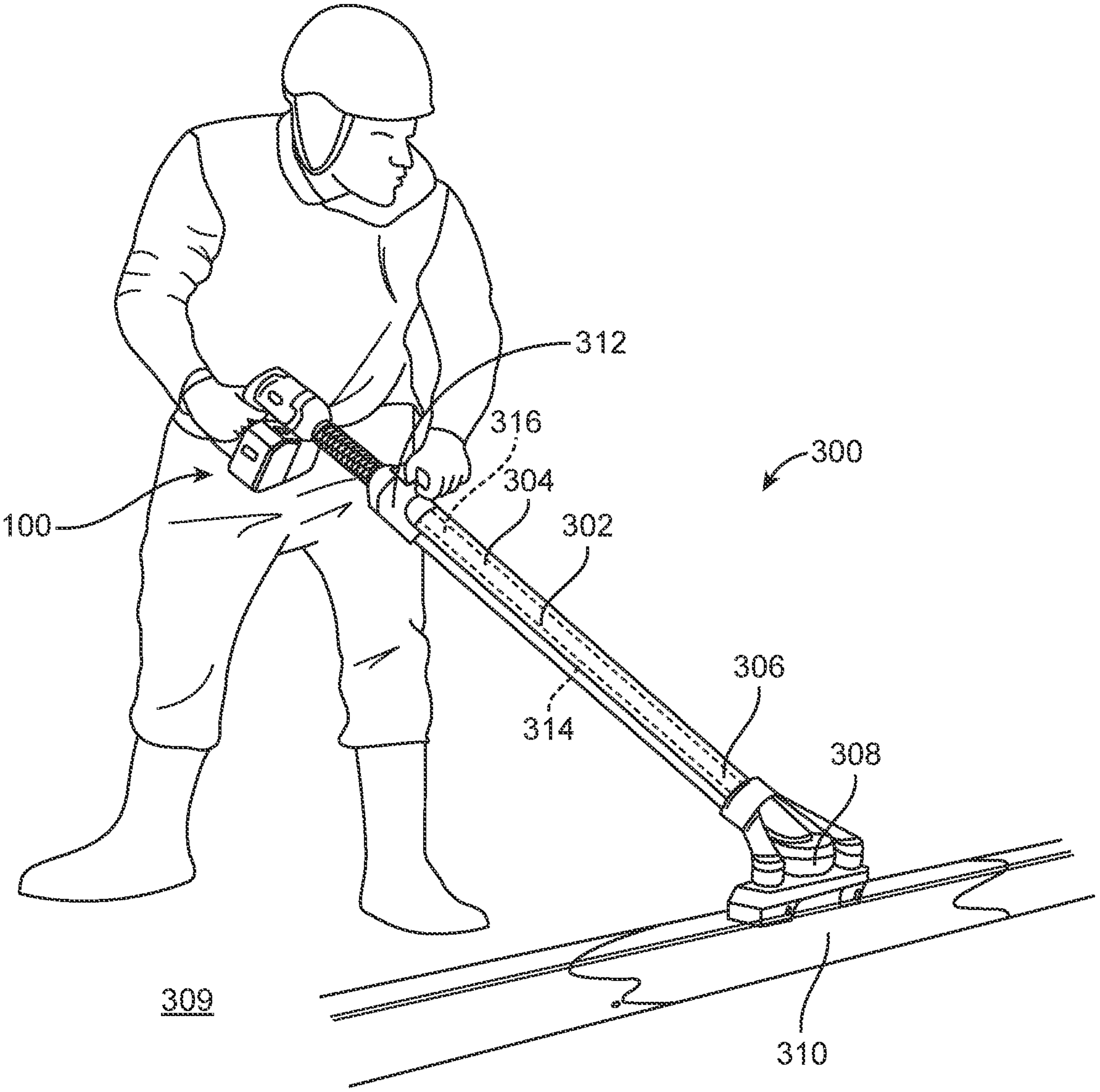
FIG. 3 is a perspective view of the modular power unit of FIG. 1 connected to a vibrating screed in accordance with an embodiment of the present invention.

FIG. 3 shows the modular power unit 100 engaged with another concrete tool accessory, such as a vibrating screed 300. The vibrating screed 300 includes a rigid drive shaft housing 302 having a proximal end 304 and a distal end 306. The distal end 306 includes a vibrating head 308 having an elongated blade 310 affixed thereto. The elongated blade 310 is passed over wet concrete 309 to smooth the wet concrete 309. The proximal end 304 of the rigid drive shaft housing 302 of the vibrating screed 300 includes a tool plug 312 that is sized and shaped to fit into and engage the tool socket 136 on the modular power unit 100. A rigid drive shaft 314 within the rigid drive shaft housing 302 of the vibrating screed 300 includes an end 316 that is configured to engage the output shaft 139 of the motor 121 of the modular power unit 100.

Accordingly, a user actuates the motor of the modular power unit 100 by depressing the trigger 124 on the first handle 110. The motor 121 drives the output shaft 139 of the modular power unit 100 which, in turn, drives the rigid drive shaft 314 within the rigid drive shaft housing 302 of the vibrating screed 300 to actuate the vibrating head 308 and smooth the wet concrete 309 with the elongated blade 310. To increase portability, the rigid drive shaft housing 302, alternatively, may be collapsible, foldable, or removable.

Figure 4:
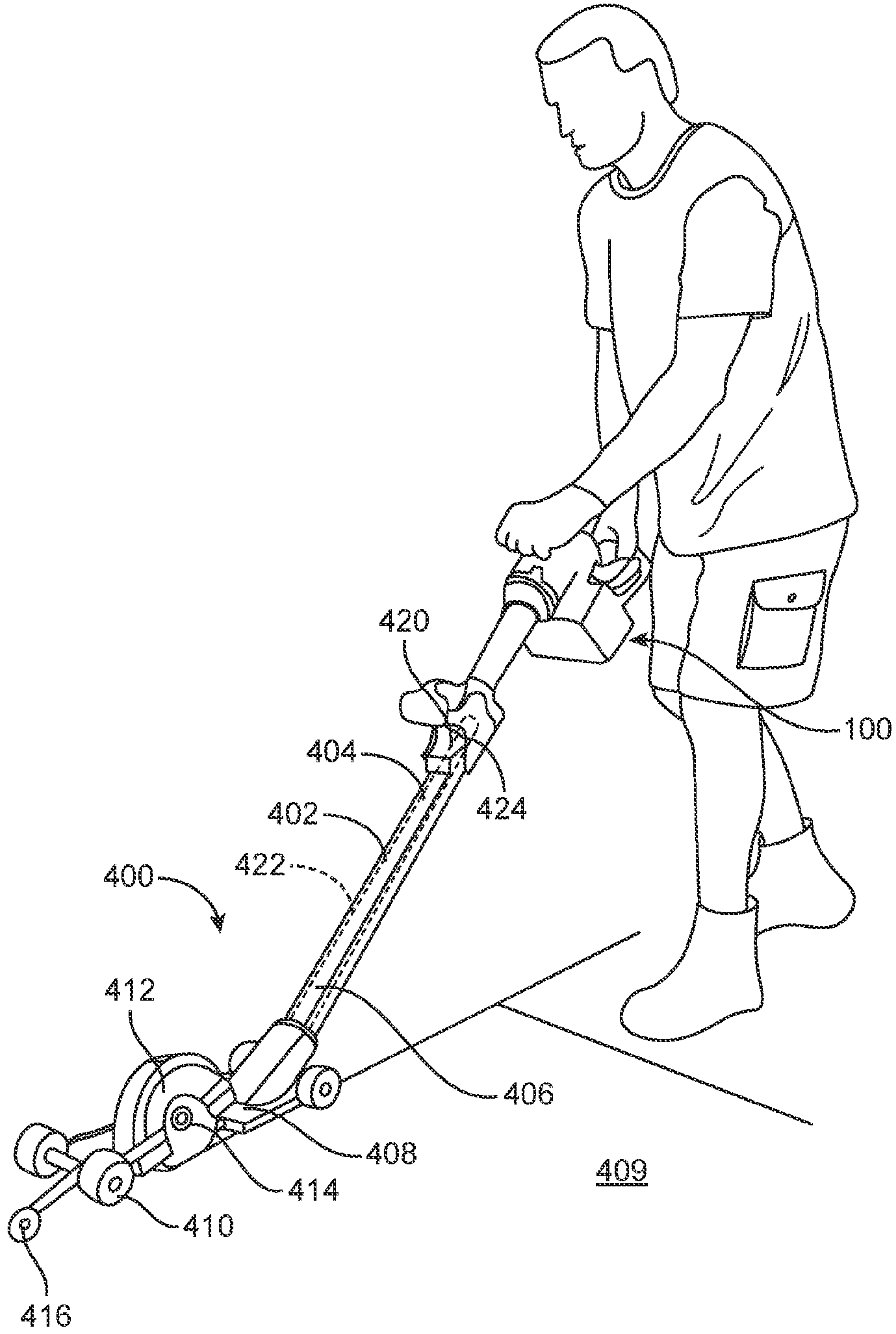
FIG. 4 is a perspective view of the modular power unit of FIG. 1 connected to an early entry saw in accordance with an embodiment of the present invention.

Referring to FIG. 4, the modular power unit 100 is shown engaged with another concrete tool accessory, such as an early entry saw 400. The early entry saw 400 includes a rigid drive shaft housing 402 having a proximal end 404 and a distal end 406. The distal end 406 includes a saw unit 408 having a plurality of wheels 410, a blade housing 412, a circular saw blade 414 within the blade housing 412, and a guide 416 extending from the saw unit 408 adjacent the blade housing 412. The wheels 410 contact a work surface during operating of the early entry saw 400. The early entry saw 400 is used to cut green, or uncured, concrete 409 to provide stress relief as the wet concrete 409 cures and throughout the life of the concrete 409, after it cures, to minimize cracking. The proximal end 404 of the rigid drive shaft housing 402 of the early entry saw 400 includes a tool plug 420 that is sized and shaped to fit into and engage the tool socket 136 of the modular power unit 100. A rigid drive shaft 422 within the rigid drive shaft housing 402 of the early entry saw 400 includes an end 424 that is configured to engage the output shaft 139 of the motor 121 within the modular power unit 100.

Accordingly, a user actuates the motor 121 on the modular power unit 100 by depressing the trigger 124 on the first handle 110. The motor 121 drives the output shaft 139 of the modular power unit 100 which, in turn, drives the rigid drive shaft 422 within the rigid drive shaft housing 402 of the early entry saw 400 to actuate the circular saw blade 414 within the saw unit 408 on the distal end 406 of the rigid drive shaft housing 402 and cut the green concrete 409 on which the early entry saw 400 is operated. To increase portability, the rigid drive shaft housing 402, alternatively, may be collapsible, foldable, or removable.

Figure 5:
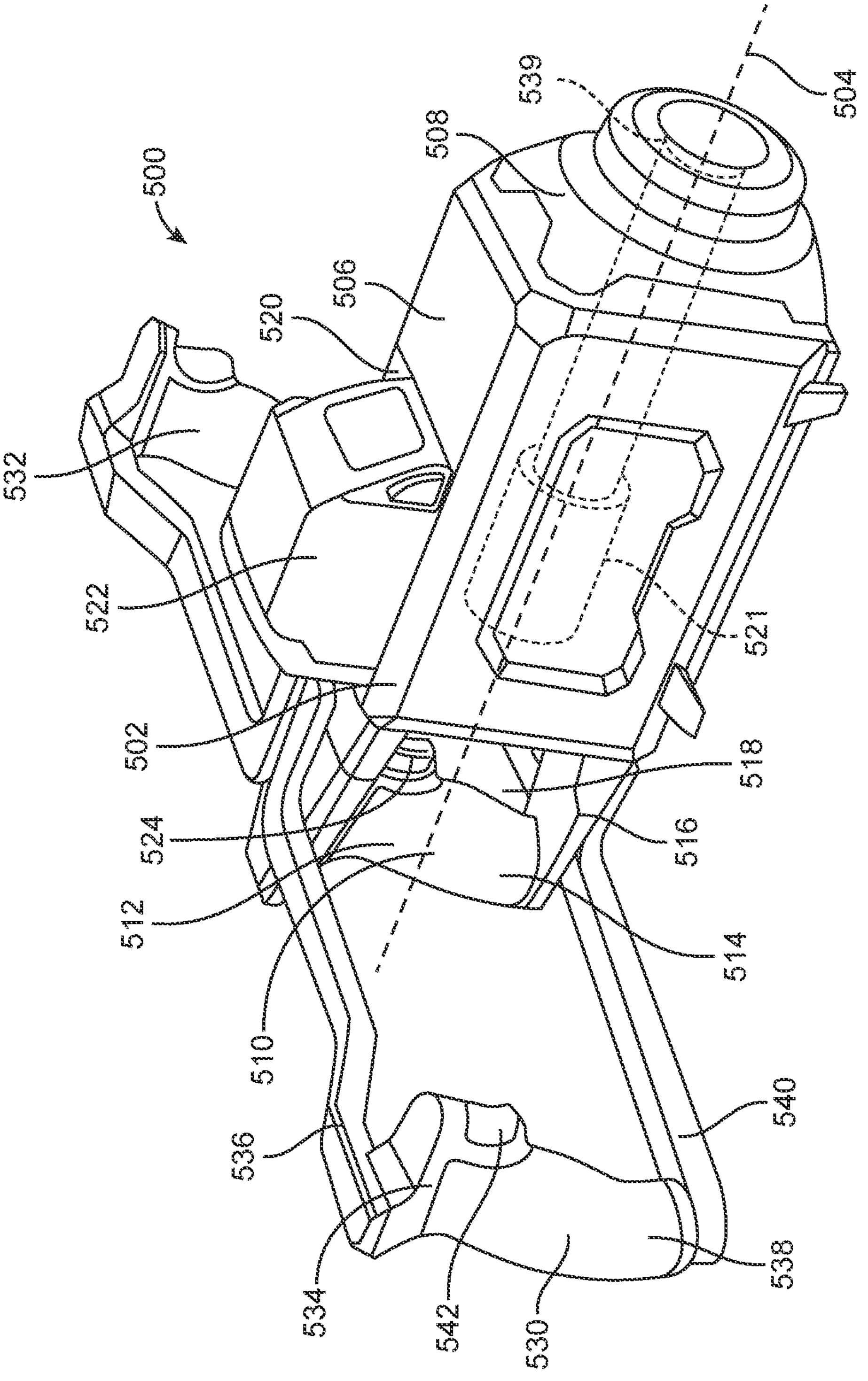
FIG. 5 is a perspective view of a modular power unit for a modular concrete tool in accordance with a second embodiment of the present invention.

Referring now to FIG. 5, a second embodiment of a modular power unit is illustrated and is generally designated 500. As shown, the modular power unit 500 includes a housing 502 that extends along a longitudinal axis 504. The housing 502 includes a motor housing portion 506 and a front housing portion 508 coupled to the motor housing portion 506. An inboard handle 510 extends in a generally rearward direction from the motor housing portion 506. The inboard handle 510 is generally shaped like a pistol grip and includes a proximal end 512 coupled to the motor housing portion 506 and a distal end 514 coupled the motor housing portion 506 via a lateral arm 516. The inboard handle 510 extends along the longitudinal axis 504 of the modular power unit 500.

The inboard handle 510 is spaced apart from the motor housing portion 506 such that an aperture 518 is established, or otherwise formed, between the inboard handle 510 and the motor housing portion 506. The inboard handle 510 acts as a grip that can be grasped by a user during operation of the modular power unit 500. The housing 502 also includes a battery receptacle 520 that is formed in the housing 502 forward, and adjacent, to the inboard handle 510 along the longitudinal axis 504. The modular power unit 500 is powered by a direct current (DC) battery pack 522 that is removably engaged with the battery receptacle 520 in front of the inboard handle 510. The battery pack 522 includes a plurality of rechargeable battery cells electrically connected to each other to provide a desired output (e.g., nominal voltage, current capacity, etc.) of the battery pack 522. In a particular aspect, the battery pack 522 includes a plurality of Lithium-based battery cells. As shown, the inboard handle 510 of the modular power unit 500 includes an inboard trigger switch, with an exposed inboard trigger 524 that is depressible by the user, to selectively electrically connect a motor (e.g., a brushless direct current motor) within the motor housing portion 506 to the battery pack 522 and as such, provide power to the motor.

As illustrated in FIG. 5, the modular power unit 500 includes a first outboard handle 530 and a second outboard handle 532. The first outboard handle 530 is spaced a distance $D_1$ from the longitudinal axis 504. The second outboard handle 530 is spaced a distance $D_2$ from the longitudinal axis 504. In a particular embodiment, $D_1$ is substantially equal to $D_2$. As such, the outboard handles 530, 532 are spaced apart from the longitudinal axis 504 on opposite sides of the longitudinal axis 504 and the housing 502. The outboard handles 530, 532 include proximal ends 534 that are connected to the housing 502 via an upper cross member 536 and distal ends 538 that are connected to the housing 502 via a lower cross member 540. The cross members 536, 540 are substantially perpendicular to the longitudinal axis 504 of the housing 502. Either one, or both, of the outboard handles 530, 532 may include an outboard trigger switch, with an exposed outboard trigger 542 that is depressible by the user, to selectively electrically connect the motor within the motor housing portion 506 to the battery pack 522 and as such, provide power to the motor. The motor within the motor housing portion 506 is selectively operable in response to a signal from the inboard trigger 524, the outboard trigger 542, or a combination thereof. The outboard handles 530, 532 may be grasped by the user during operation of the modular power unit 500 to further help balance and manipulate the modular power unit 500. The inboard handle 510 and the outboard handles 530, 532 allow a user to operate the modular power unit 500, and any attachments, with one or two hands.

As illustrated in FIG. 5, the front housing portion 508 of the modular power unit 500 includes a tool socket 550. The tool socket 550 is configured to engage a tool plug of a concrete tool accessory, as described in greater detail herein. The modular power unit 500 further includes a lock/release button 552 adjacent to the tool socket 550. The lock/release button may engage a complementary structure on the tool plug of a concrete tool accessory to maintain the tool plug of the concrete tool accessory in engagement with the tool socket 550 and to maintain the drive shaft of the concrete tool accessory in engagement with an output shaft of the modular power unit 500 that extends into the tool socket 550.

Figure 6:
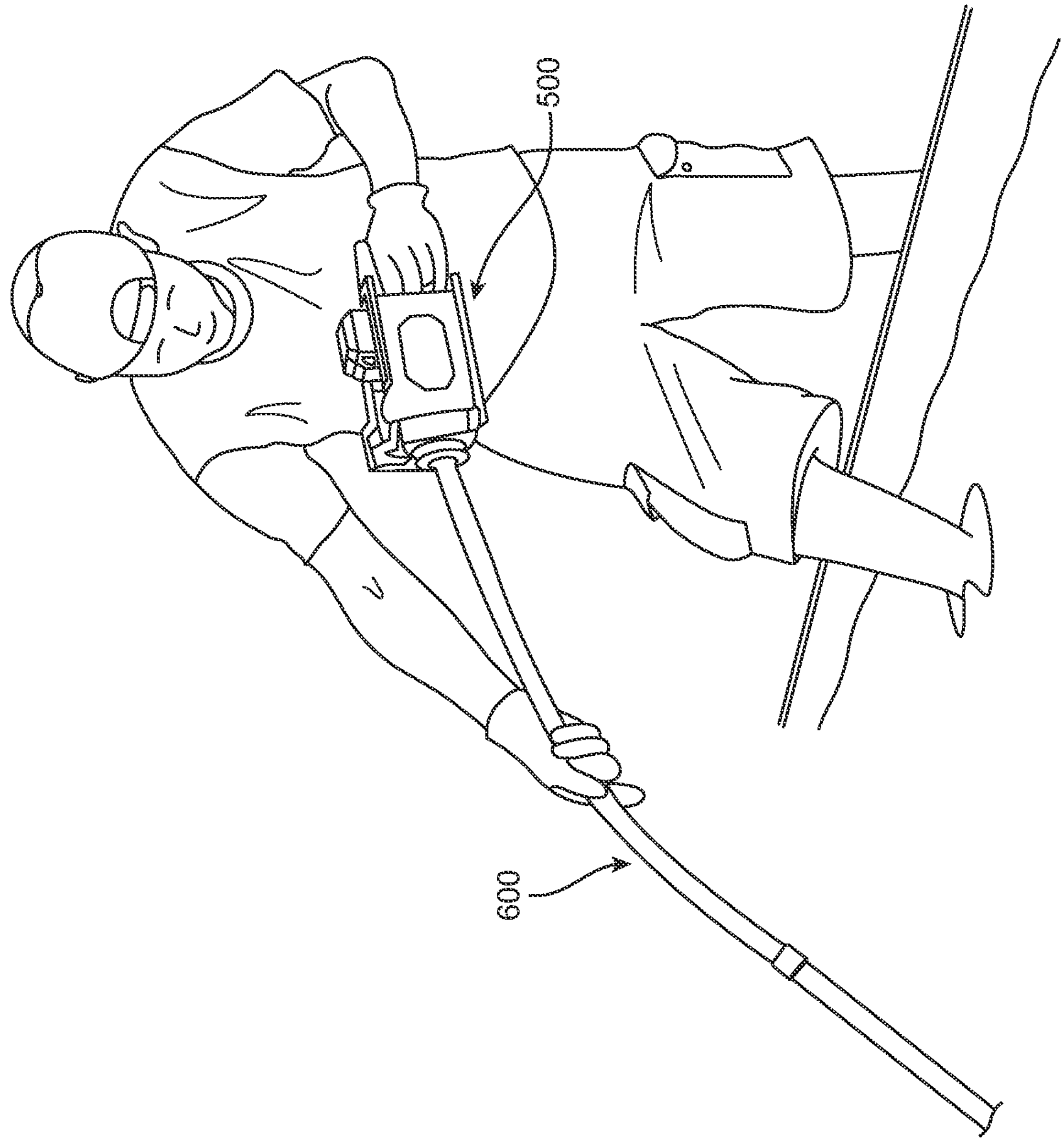
FIG. 6 is a perspective view of the modular power unit of FIG. 5 connected to a needle vibrator in accordance with an embodiment of the present invention.
Figure 7:
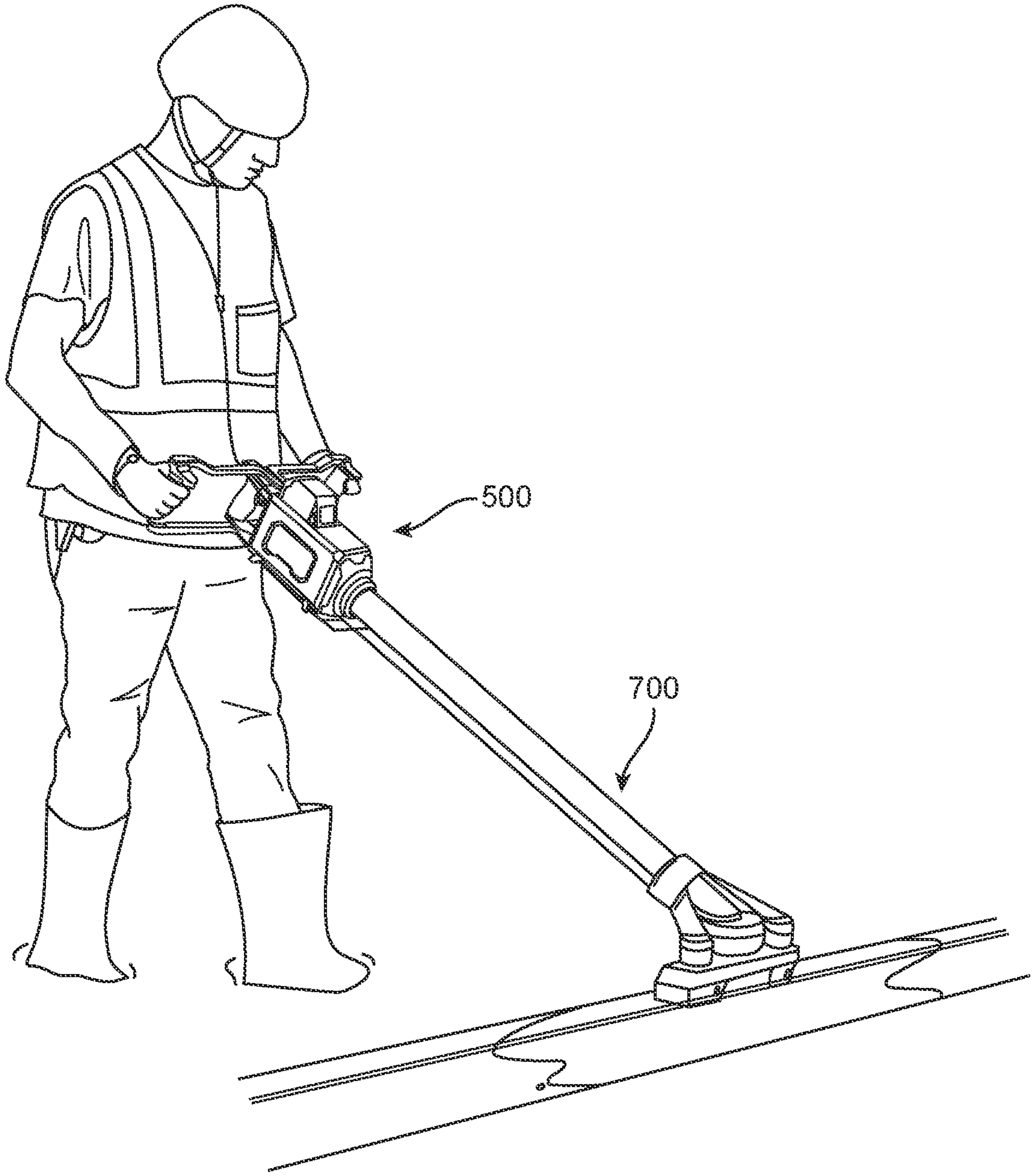
FIG. 7 is a perspective view of the modular power unit of FIG. 5 connected to a vibrating screed in accordance with an embodiment of the present invention.
Figure 8:
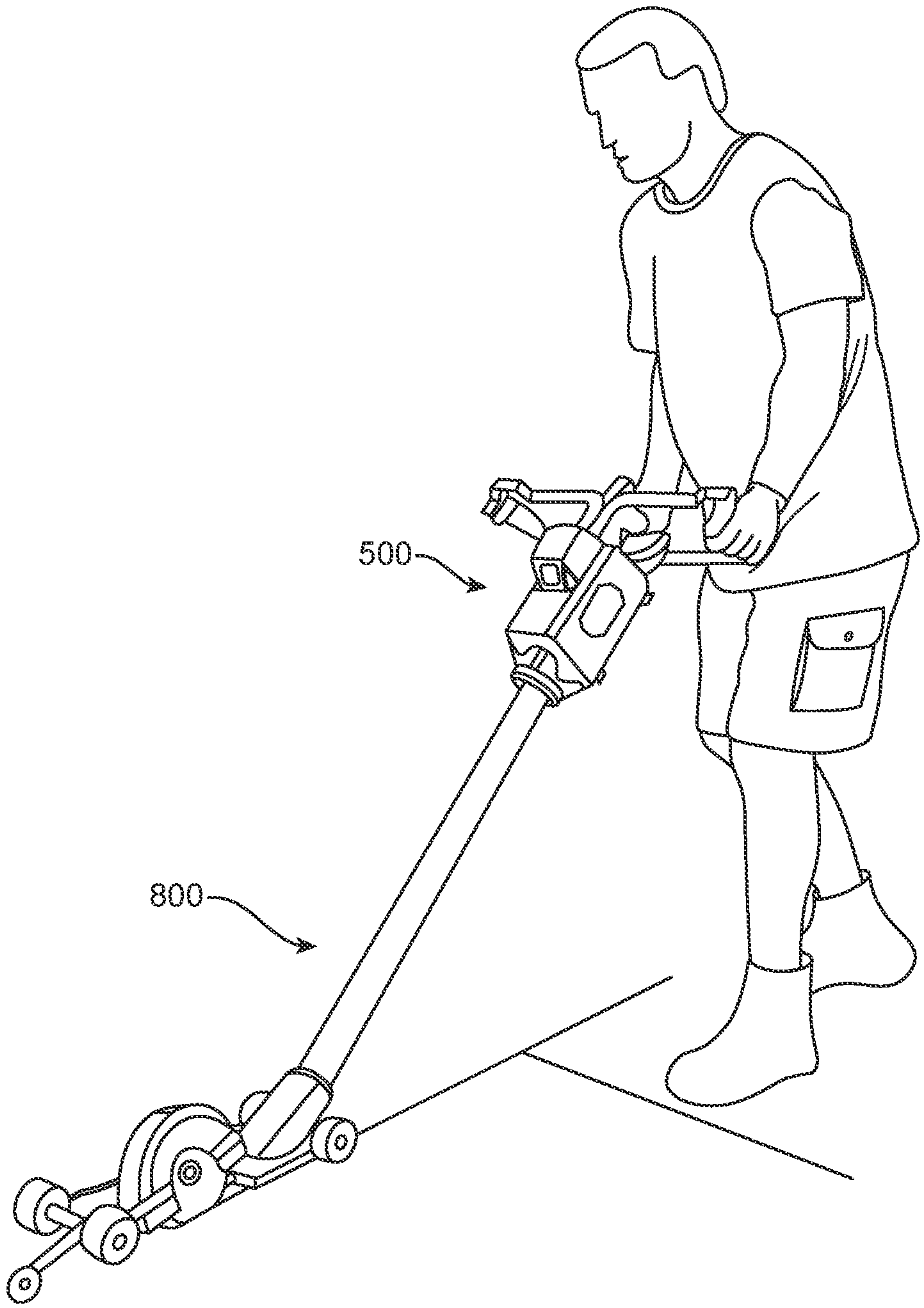
FIG. 8 is a perspective view of the modular power unit of FIG. 5 connected to an early entry saw in accordance with an embodiment of the present invention.

As shown in FIG. 6 through FIG. 8, the modular power unit 500 may be selectively, and removably, engaged with a needle vibrator 600, a vibrating screed 700, and/or an early entry saw 800. It is to be understood that the needle vibrator 600 may be similar to the needle vibrator 200, described above. The vibrating screed 700 may be similar to the vibrating screed 300, described above. Further, the early entry saw 800 may be similar to the early entry saw 400, also described above.

Figure 9:
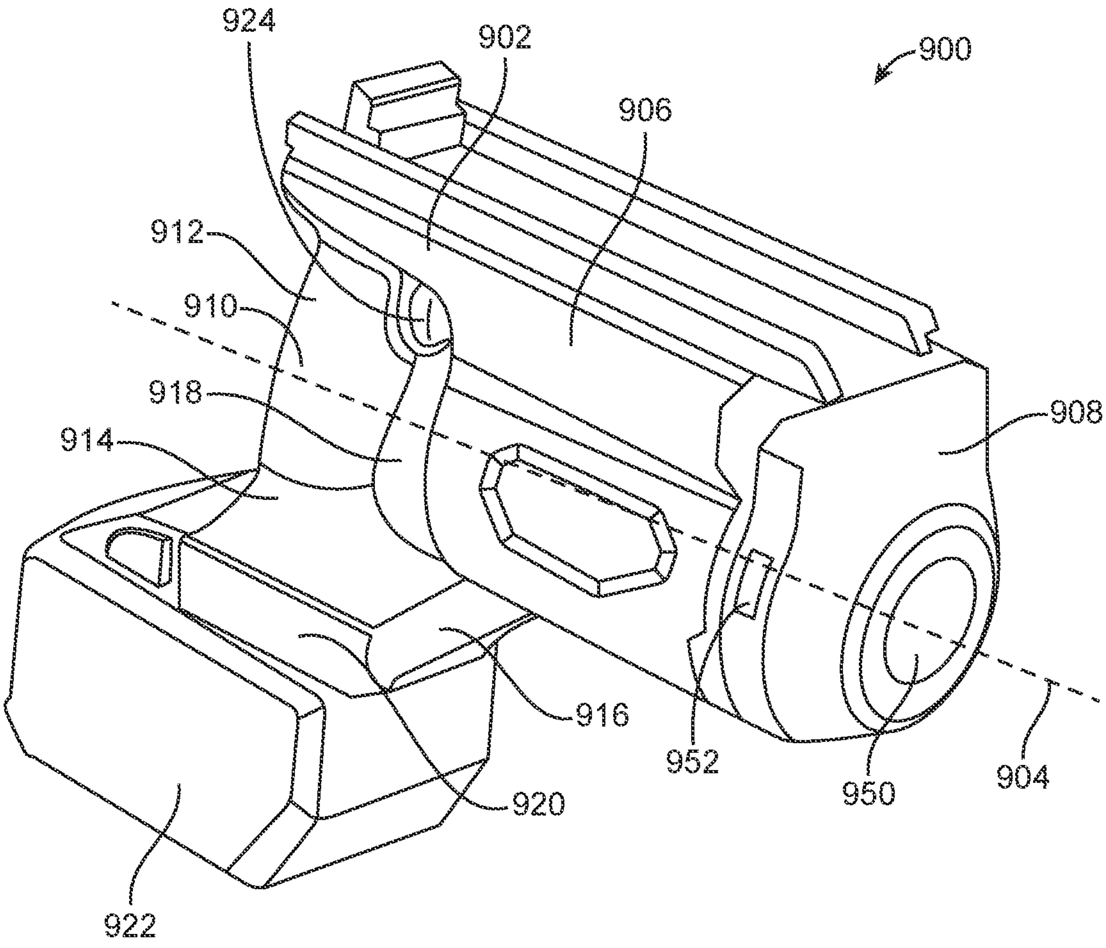
FIG. 9 is a perspective view of a modular power unit for a modular concrete tool in accordance with a third embodiment of the present invention.

FIG. 9 depicts a third embodiment of a modular power unit that is generally designated 900. As shown, the modular power unit 900 includes a housing 902 that extends along a longitudinal axis 904. The housing 902 includes a motor housing portion 906 and a front housing portion 908 coupled to the motor housing portion 906. A handle 910 extends in a generally rearward and downward direction from the housing 902 behind, and spaced from, the motor housing portion 906. The handle 910 is generally shaped like a pistol grip and includes a proximal end 912 coupled to the housing 902 and a distal end 914 coupled to the motor housing portion 906 in front of the handle 910 via a lateral arm 916.

The handle 910 is spaced apart from the battery receptacle such that an aperture 918 is established, or otherwise formed, between the handle 910 and the battery receptacle. The handle 910 acts as a grip that can be grasped by a user during operation of the modular power unit 900. The handle 910 also includes a battery receptacle 920 formed in the base of the handle 910, e.g., below the distal end 914 of the handle 910. The modular power unit 900 is powered by a direct current (DC) battery pack 922 that is removably engaged with the battery receptacle in front of the handle 910. The battery pack 922 includes a plurality of rechargeable battery cells electrically connected to each other to provide a desired output (e.g., nominal voltage, current capacity, etc.) of the battery pack 922. In a particular aspect, the battery pack 922 includes a plurality of Lithium-based battery cells. The handle 910 of the modular power unit 900 includes a trigger switch 924, with an exposed trigger that is depressible by the user, to selectively electrically connect a motor within the motor housing portion 906 to the battery pack 922 and as such, provide power to the motor.

As illustrated in FIG. 9, the front housing portion 908 of the modular power unit 900 includes a tool socket 950. The tool socket 950 is configured to engage a tool plug of a concrete tool accessory, as described in greater detail herein. The modular power unit 900 further includes a lock/release button 952 adjacent to the tool socket 950. The lock/release button may engage a complementary structure on the tool plug of a concrete tool accessory to maintain the tool plug of the concrete tool accessory in engagement with the tool socket 950 and to maintain the tool plug of the concrete tool accessory in engagement with an output shaft of the modular power unit 900 that extends into the tool socket 950.

Figure 10:
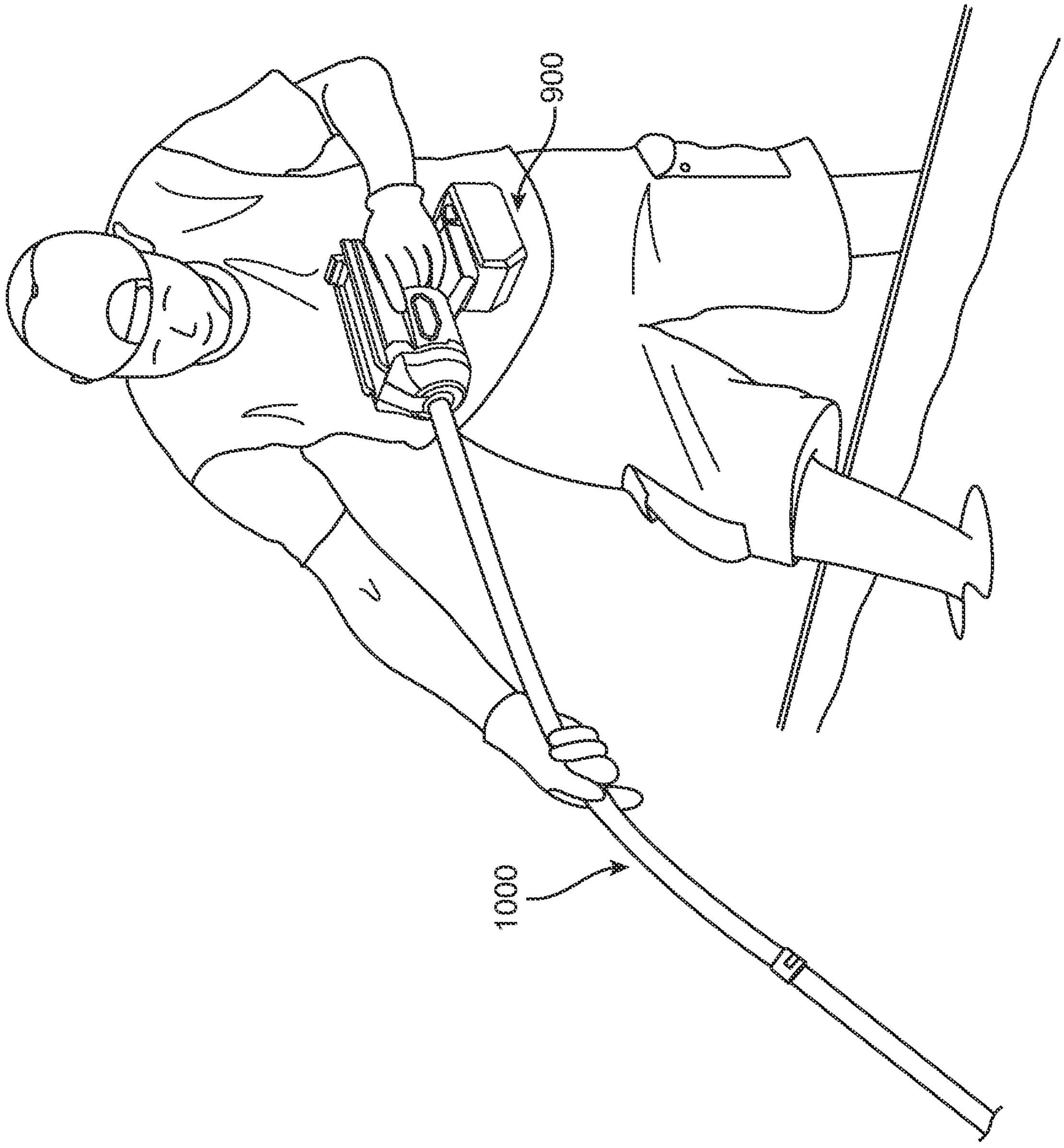
FIG. 10 is a perspective view of the modular power unit of FIG. 9 connected to a needle vibrator in accordance with an embodiment of the present invention.
Figure 11:
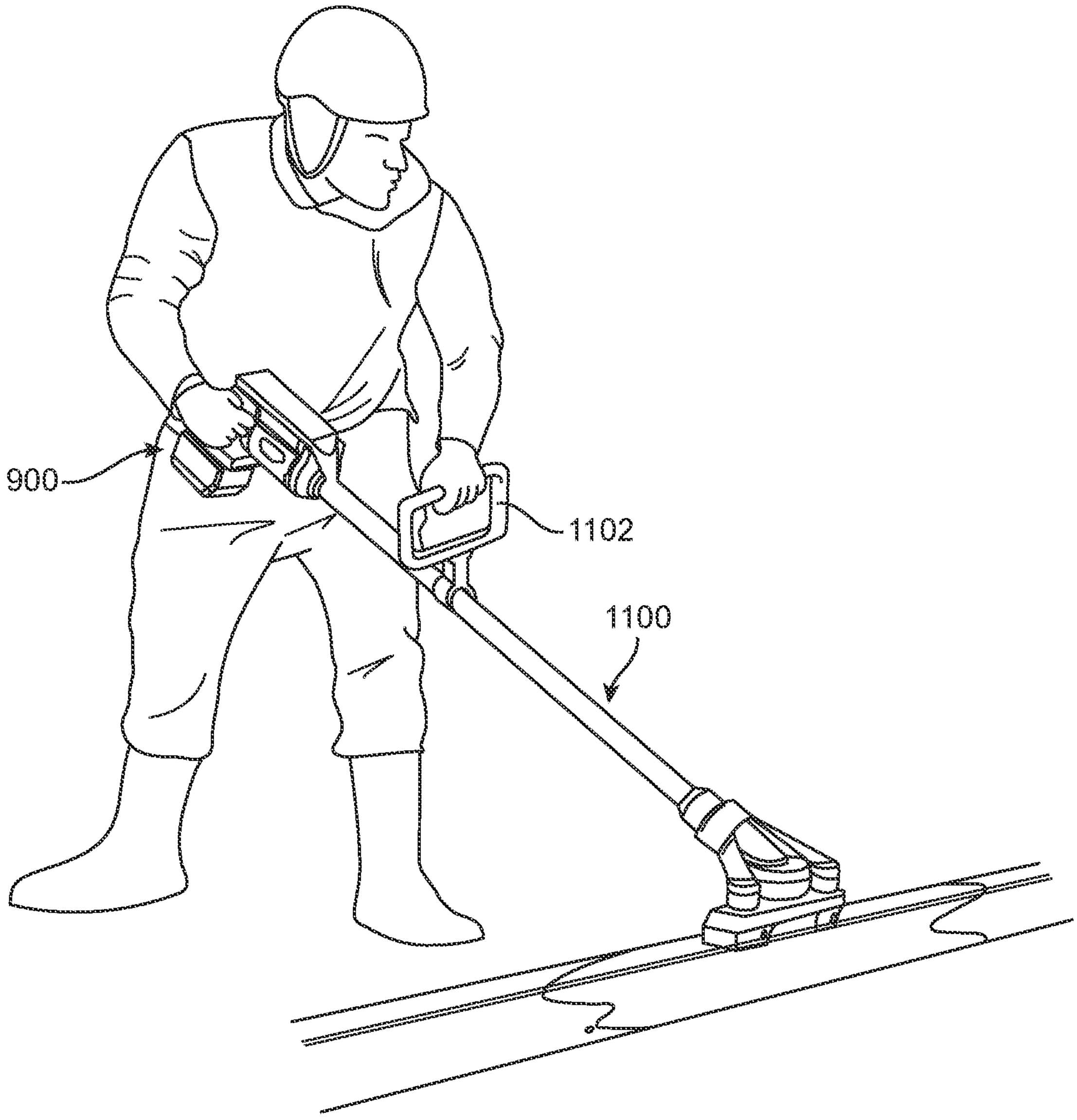
FIG. 11 is a perspective view of the modular power unit of FIG. 9 connected to a vibrating screed in accordance with an embodiment of the present invention.
Figure 12:
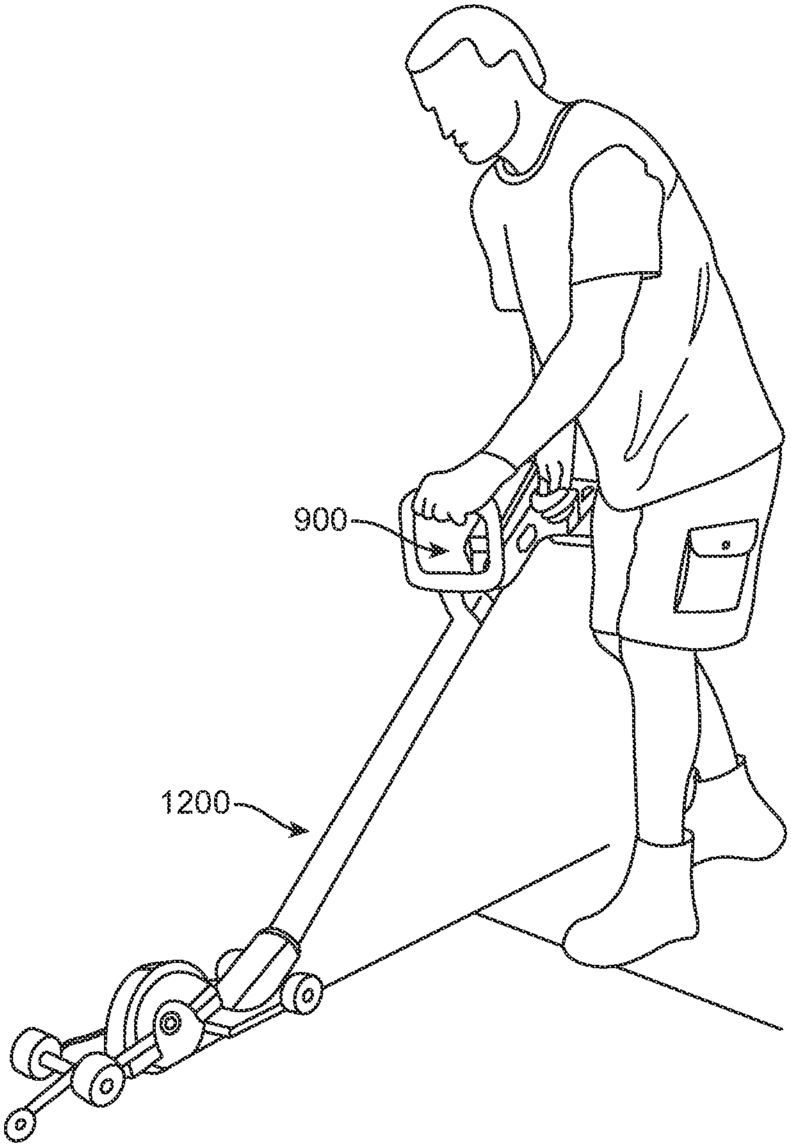
FIG. 12 is a perspective view of the modular power unit of FIG. 9 connected to an early entry saw in accordance with an embodiment of the present invention.

As shown in FIG. 10 through FIG. 12, the modular power unit 900 may be selectively, and removably, engaged with a needle vibrator 1000, a vibrating screed 1100, and/or an early entry saw 1200. It is to be understood that the needle vibrator 1000 may be similar to the needle vibrator 200, described above. The vibrating screed 1100 may be similar to the vibrating screed 300, described above. However, the vibrating screed 1100 may further include a handle 1102 that may be utilized in conjunction with the handle 910 on the modular power unit 900 to manipulate and control the modular power unit 900 and vibrating screed 1100, attached thereto, during use. Further, the early entry saw 1200 may be similar to the early entry saw 1200, also described above. The early entry saw 1200 may further include a handle 1202 that may be utilized in conjunction with the handle 910 on the modular power unit 900 to manipulate and control the modular power unit 900 and early entry saw 1200, attached thereto, during use.

Figure 13:
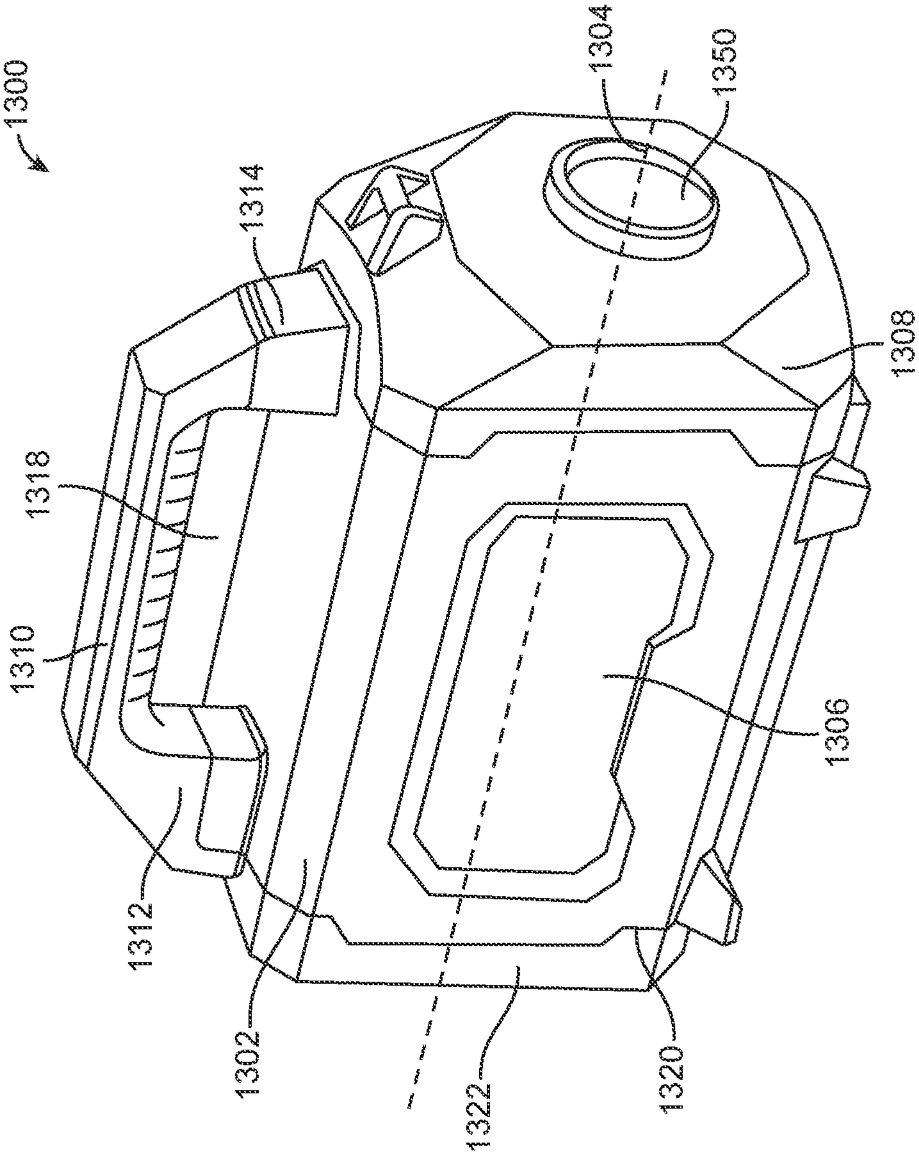
FIG. 13 is a perspective view of a modular power unit for a modular concrete tool in accordance with a fourth embodiment of the present invention.

Referring now to FIG. 13, a fourth embodiment of a modular power unit is illustrated and is generally designated 1300. As shown, the modular power unit 1300 includes a housing 1302 that extends along a longitudinal axis 1304. The housing 1302 includes a motor housing portion 1306 and a front housing portion 1308 coupled to the motor housing portion 1306. A handle 1310 extends in a generally upward direction from the motor housing portion 1306 at least partially along the length of the motor housing portion 1306. The handle 1310 is generally U-shaped and includes a proximal end 1312 coupled to the motor housing portion 1306 and a distal end 1314 opposite the proximal end 1312 and also coupled to the motor housing portion 1306.

The handle 1310 is spaced apart from the motor housing portion 1306 such that an aperture 1318 is established, or otherwise formed, between the handle 1310 and the motor housing portion 1306. The handle 1310 acts as a grip that can be grasped by a user during operation of the modular power unit 1300. The modular power unit 1300 includes a battery receptacle 1320 formed in the housing 1302 behind the motor housing portion 1306. Further, the modular power unit 1300 is powered by a direct current (DC) battery pack 1322 that is removably engaged with the battery receptacle 1320. The battery pack 1322 includes a plurality of rechargeable battery cells electrically connected to each other to provide a desired output (e.g., nominal voltage, current capacity, etc.) of the battery pack 1322. In a particular aspect, the battery pack 1322 includes a plurality of Lithium-based battery cells.

As illustrated in FIG. 13, the front housing portion 1308 of the modular power unit 1300 includes a tool socket 1350. The tool socket 1350 is configured to engage a tool plug, or direct drive unit, of a concrete tool accessory, as described in greater detail herein. The modular power unit 1300 further includes a lock/release button adjacent to the tool socket 1350. The lock/release button may engage a complementary structure on the tool plug of a concrete tool accessory to maintain the tool plug of the concrete tool accessory in engagement with the tool socket 1350 and to maintain the tool plug of the concrete tool accessory in engagement with an output shaft of the modular power unit 1300 that extends into the tool socket 1350.

Figure 14:
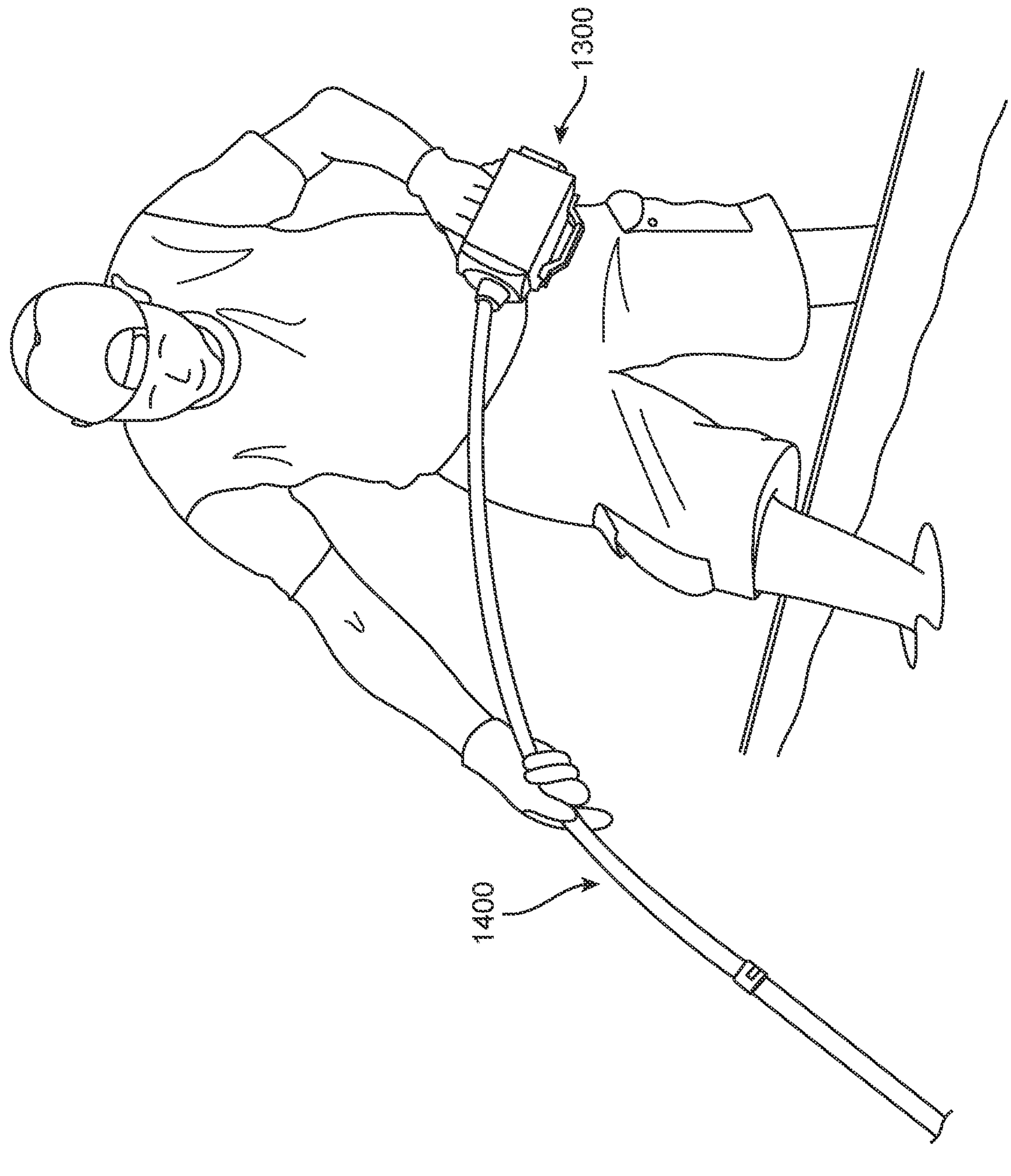
FIG. 14 is a perspective view of the modular power unit of FIG. 13 connected to a needle vibrator in accordance with an embodiment of the present invention.
Figure 15:
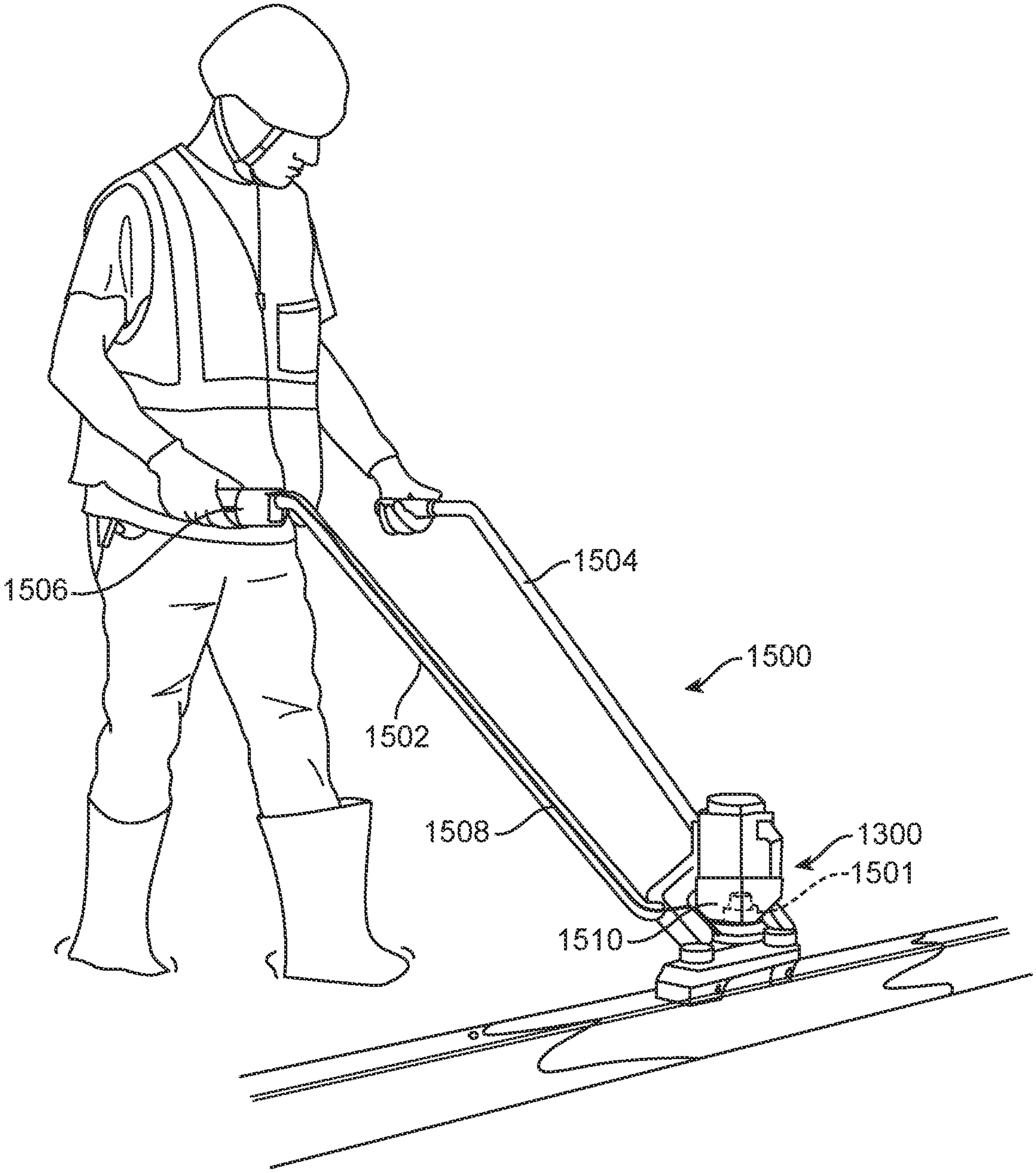
FIG. 15 is a perspective view of the modular power unit of FIG. 13 connected to a vibrating screed in accordance with an embodiment of the present invention.
Figure 16:
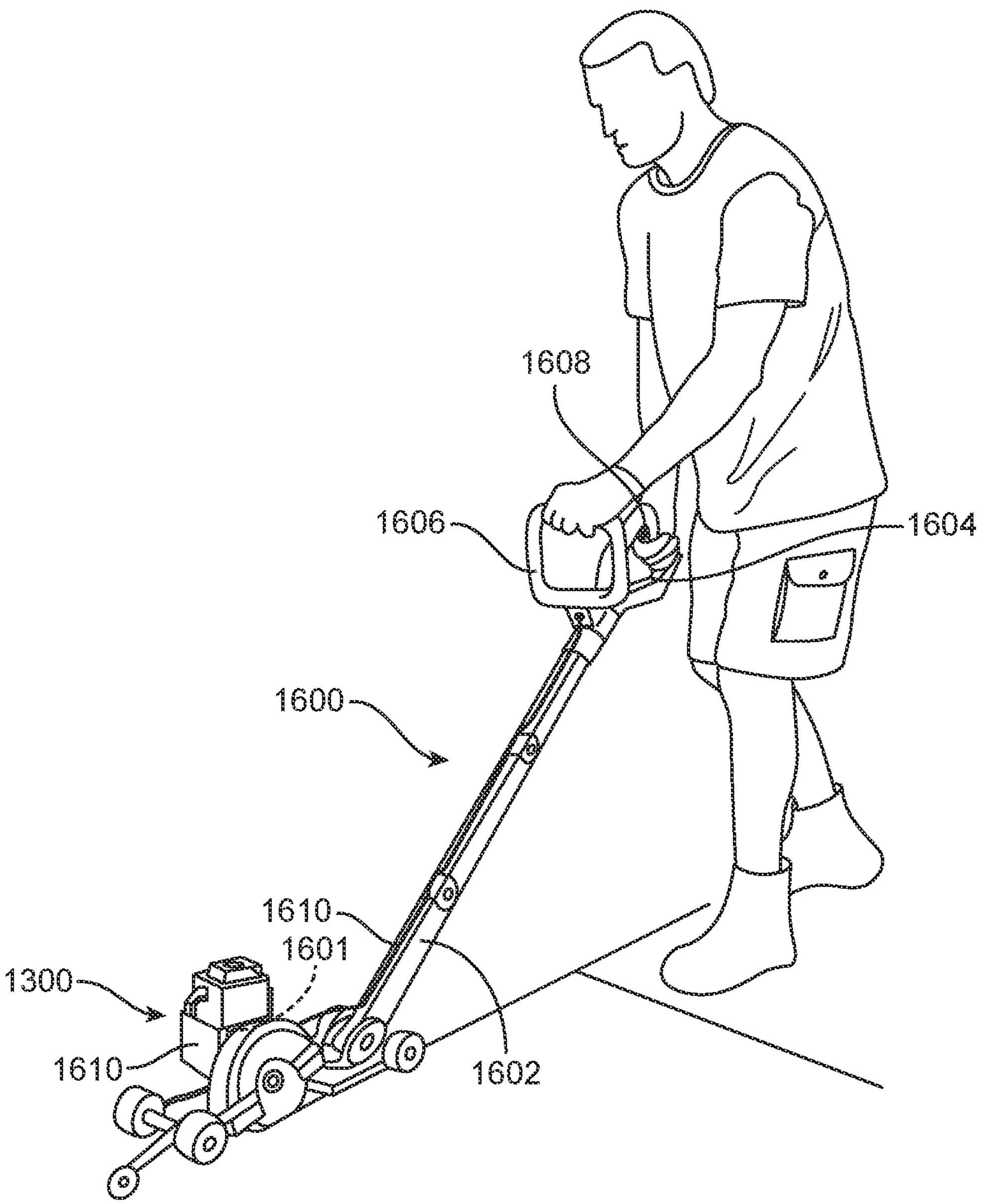
FIG. 16 is a perspective view of the modular power unit of FIG. 13 connected to an early entry saw in accordance with an embodiment of the present invention.

As shown in FIG. 14 through FIG. 16, the modular power unit 1300 may be selectively, and removably, engaged with a needle vibrator 1400, a vibrating screed 1500, and/or an early entry saw 1600. It is to be understood that the needle vibrator 1400 may be similar to the needle vibrator 200, described above. The vibrating screed 1500 may be similar to the vibrating screed 300, described above. However, the vibrating screed 1500 includes a first handle 1502 and a second handle 1504 that may be utilized to manipulate and control the vibrating screed 1500 with the modular power unit 1300 connected thereto during operation. Further, the vibrating screed 1500 includes a direct drive plug 1501 that fits into the tool socket 1350 on the modular power unit 1300. The first handle 1502 includes a controller 1506 and a control line 1508 that connects the controller 1506 to the modular power unit 1300. The controller 1506 on the first handle 1502 of the vibrating screed 1500 is a wired, remote controller and is used to control the operation of the modular power unit 1300, and the vibrating screed 1500 to which it is attached, in lieu of a trigger on the modular power unit 1300. The vibrating screed 1500 further includes a modular power unit receptacle 1510 in which the modular power unit 1300 is removably engaged.

The early entry saw 1600 may be similar to the early entry saw 1600, also described above. The early entry saw 1600 further includes a shaft 1602 having a first handle 1604 and a second handle 1606 coupled thereto. During operation, the handles 1604, 1606 are utilized to manipulate and control the early entry saw 1600 with the modular power unit 1300 connected thereto. The early entry saw 1600 further includes a direct drive plug 1601 that fits into the tool socket 1350 on the modular power unit 1300. The first handle 1604 includes a controller 1608 and a control line 1610 that connects the controller 1608 to the modular power unit 1300. The controller 1608 on the first handle 1604 of the early entry saw 1600 is a wired, remote controller and is used to control the operation of the modular power unit 1300, and the early entry saw 1600 to which it is attached, in lieu of a trigger on the modular power unit 1300. The vibrating screed 1600 further includes a modular power unit receptacle 1610 in which the modular power unit 1300 is removably engaged.

Various features of the invention are set forth in the following claims.

What is claimed is:

1. A modular concrete tool comprising:
a modular power unit having:
a housing with a motor housing portion and a front housing portion coupled to the motor housing portion;
a battery receptacle configured to removably engage a battery pack;
a handle extending from the motor housing portion;
a motor disposed within the motor housing portion, the motor configured to provide torque to an output shaft extending through the front housing portion; and
a tool socket formed in the front housing portion in which the output shaft terminates,
wherein the housing of the modular power unit includes an extension having a proximal end connected to the tool socket.

2. The modular concrete tool of claim 1, wherein the tool socket is a first tool socket and the extension includes a second tool socket and the second tool socket is configured to removably engage a tool plug.

3. The modular concrete tool of claim 2, further comprising a concrete tool accessory including the tool plug engageable with the second tool socket of the modular power unit, wherein the output shaft is configured to removably engage a drive shaft of the concrete tool accessory.

4. The modular concrete tool of claim 3, wherein the concrete tool accessory includes at least one of a needle vibrator, a vibrating screed, or an early entry saw.

5. The modular concrete tool of claim 3, wherein the handle includes a pistol grip.

6. The modular concrete tool of claim 1, wherein the handle extends in a rearward and downward direction from the motor housing portion.

7. A modular concrete tool comprising:
a modular power unit having:
a housing with a motor housing portion and a front housing portion coupled to the motor housing portion;
a battery receptacle configured to removably engage a battery pack;
a handle extending from the motor housing portion;
a motor disposed within the motor housing portion, the motor configured to provide torque to an output shaft extending through the front housing portion;
a tool socket formed in the front housing portion in which the output shaft terminates; and
a concrete tool accessory including a tool plug configured to removably engage the tool socket, wherein the concrete tool accessory comprises a vibrating screed having a rigid drive shaft housing that defines a proximal end and a distal end, wherein the tool plug is disposed on the proximal end and a vibrating head is disposed on the distal end, and wherein a drive shaft within the rigid drive shaft housing engages the output shaft.

8. The modular concrete tool of claim 7, wherein the vibrating screed further comprises an elongated blade affixed to the vibrating head, and wherein the vibrating head is driven when the motor is energized.

9. The modular concrete tool of claim 7, wherein the handle is an inboard handle that extends along a longitudinal axis defined by the modular concrete tool.

10. The modular concrete tool of claim 9, further comprising a first outboard handle spaced a distance D1 from the longitudinal axis.

11. The modular concrete tool of claim 10, further comprising a second outboard handle spaced a distance D2 from the longitudinal axis opposite the first outboard handle.

12. The modular concrete tool of claim 11, further comprising an inboard trigger switch extending from the inboard handle.

13. The modular concrete tool of claim 12, further comprising an outboard trigger switch extending from at least one of the first outboard handle and the second outboard handle.

14. The modular concrete tool of claim 13, wherein the motor is selectively operable in response to a signal from the inboard trigger switch, the outboard trigger switch, or a combination thereof.

15. The modular concrete tool of claim 9, wherein the inboard handle extends in an upward direction from the motor housing portion.

16. A modular concrete tool comprising:
a modular power unit having:
a housing with a motor housing portion and a front housing portion coupled to the motor housing portion;
a battery receptacle configured to removably engage a battery pack;
a handle extending from the motor housing portion;
a motor disposed within the motor housing portion, the motor configured to provide torque to an output shaft extending through the front housing portion;
a tool socket formed in the front housing portion in which the output shaft terminates; and
a concrete tool accessory including a tool plug configured to removably engage the tool socket, wherein the concrete tool accessory comprises an early entry saw having a rigid drive shaft housing that defines a proximal end and a distal end, wherein the tool plug is disposed on the proximal end and a saw unit is disposed on the distal end, and wherein a drive shaft within the rigid drive shaft housing engages the output shaft.

17. The modular concrete tool of claim 16, wherein the saw unit includes a plurality of wheels saw for contacting a work surface, a blade housing, a circular saw blade within the blade housing, and a guide extending from the blade housing for indicating a cut line for the circular saw blade.

18. The modular concrete tool of claim 16, wherein the handle is an inboard handle that extends along a longitudinal axis defined by the modular concrete tool.

19. The modular concrete tool of claim 18, further comprising a first outboard handle spaced a distance D1 from the longitudinal axis.

20. The modular concrete tool of claim 19, further comprising a second outboard handle space a distance D2 from the longitudinal axis opposite the first outboard handle.

21. The modular concrete tool of claim 20, further comprising an inboard trigger switch extending from the inboard handle.

22. The modular concrete tool of claim 21, further comprising an outboard trigger switch extending from at least one of the first outboard handle and the second outboard handle.

23. The modular concrete tool of claim 22, wherein the motor is selectively operable in response to a signal from the inboard trigger, the outboard trigger, or a combination thereof.

24. The modular concrete tool of claim 18, wherein the inboard handle extends in an upward direction from the motor housing portion.

25. A modular concrete tool comprising:

a modular power unit having:

a housing with a motor housing portion and a front housing portion coupled to the motor housing portion;

a battery receptacle, wherein the battery receptacle is configured to removably engage a battery pack;

a handle extending from a top of the motor housing portion;

a motor disposed within the motor housing portion, the motor configured to provide torque to an output shaft extending through the front housing portion; and a tool socket formed in the front housing portion in which the output shaft terminates; and a concrete tool accessory that includes a modular power unit receptacle with a direct drive plug extending therein, wherein the modular power unit fits into the modular power unit receptacle and the tool socket fits over the direct drive plug to allow the direct drive plug to engage the output shaft, wherein the concrete tool accessory comprises a vibrating screed having a rigid drive shaft housing that defines a proximal end and a distal end, a handle is disposed on the proximal end and a vibrating head is disposed on the distal end and includes the modular power unit receptacle.

26. The modular concrete tool of claim 25, wherein the vibrating screed further comprises an elongated blade affixed to the vibrating head, and wherein the vibrating head is driven when the motor is energized.

27. A modular concrete tool comprising:

a modular power unit having:

a housing with a motor housing portion and a front housing portion coupled to the motor housing portion;

a battery receptacle, wherein the battery receptacle is configured to removably engage a battery pack;

a handle extending from a top of the motor housing portion;

a motor disposed within the motor housing portion, the motor configured to provide torque to an output shaft extending through the front housing portion; and a tool socket formed in the front housing portion in which the output shaft terminates; and a concrete tool accessory that includes a modular power unit receptacle with a direct drive plug extending therein, wherein the modular power unit fits into the modular power unit receptacle and the tool socket fits over the direct drive plug to allow the direct drive plug to engage the output shaft, wherein the concrete tool accessory comprises an early entry saw having a rigid drive shaft housing that defines a proximal end and a distal end, wherein the tool plug is disposed on the proximal end and a saw unit is disposed on the distal end and includes the modular power unit receptacle.

28. The modular concrete tool of claim 27, wherein the saw unit includes a plurality of wheels saw for contacting a work surface, a blade housing, a circular saw blade within the blade housing, and a guide extending from the saw unit for indicating a cut line for the circular saw blade.

* * * * *